(12) United States Patent
Kacin et al.

(10) Patent No.: US 9,672,078 B2
(45) Date of Patent: Jun. 6, 2017

(54) DEPLOYMENT AND MANAGEMENT OF VIRTUAL CONTAINERS

(71) Applicants: Martin Kacin, Los Altos Hills, CA (US); Mark Wright, Austin, TX (US); Michael Gray, Dublin, OH (US)

(72) Inventors: Martin Kacin, Los Altos Hills, CA (US); Mark Wright, Austin, TX (US); Michael Gray, Dublin, OH (US)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 13/743,191

(22) Filed: Jan. 16, 2013

(65) Prior Publication Data
US 2013/0198764 A1     Aug. 1, 2013

Related U.S. Application Data

(63) Continuation of application No. 12/556,525, filed on Sep. 9, 2009, now Pat. No. 8,381,231.

(60) Provisional application No. 61/095,538, filed on Sep. 9, 2008.

(51) Int. Cl.
| | |
|---|---|
| *G06F 3/00* | (2006.01) |
| *G06F 9/54* | (2006.01) |
| *G06F 9/455* | (2006.01) |
| *G06F 21/53* | (2013.01) |

(52) U.S. Cl.
CPC ............ *G06F 9/54* (2013.01); *G06F 9/45537* (2013.01); *G06F 21/53* (2013.01)

(58) Field of Classification Search
None
See application file for complete search history.

(56) References Cited

U.S. PATENT DOCUMENTS

| | | | | |
|---|---|---|---|---|
| 5,974,549 | A | * 10/1999 | Golan | .................... G06F 9/468 714/47.3 |
| 6,823,460 | B1 | * 11/2004 | Hollander | ............. G06F 9/4425 710/260 |
| 7,095,854 | B1 | 8/2006 | Ginter et al. | ................. 380/233 |
| 7,159,224 | B2 | * 1/2007 | Sharma et al. | ............... 719/310 |

(Continued)

OTHER PUBLICATIONS

PCT International Search Report and Written Opinion, PCT Application No. PCT/US2009/056406, Nov. 5, 2009, 7 pages.

(Continued)

*Primary Examiner* — Kenneth Tang
(74) *Attorney, Agent, or Firm* — Baker Botts L.L.P.

(57) ABSTRACT

A system virtualizes applications on a managed endpoint using containers. A managed endpoint receives a virtualized container from an IT automation appliance. The virtualized container includes an application and a virtualization module. The virtualization module includes computer program instructions for virtualizing the application. An operating system API call made by the application during execution is intercepted, and a portion of the computer program instructions are executed based on the operating system API call. The computer program instructions modify the behavior of the application to effect the file and data virtualization of the application. A virtualized container can be deployed and updated from an IT automation appliance along with an agent to support the deployment and updating of the virtualized container.

12 Claims, 6 Drawing Sheets

(56) References Cited

U.S. PATENT DOCUMENTS

| | | | | |
|---|---|---|---|---|
| 8,205,072 | B1* | 6/2012 | Gentil | G06F 21/53 |
| | | | | 713/150 |
| 8,381,231 | B2* | 2/2013 | Kacin et al. | 719/317 |
| 8,505,006 | B1* | 8/2013 | Larkin | G06F 9/45537 |
| | | | | 718/1 |
| 2002/0103884 | A1* | 8/2002 | Duursma | G06F 9/54 |
| | | | | 709/219 |
| 2005/0249536 | A1 | 11/2005 | Sedky et al. | 400/61 |
| 2006/0150256 | A1* | 7/2006 | Fanton | G06F 21/10 |
| | | | | 726/27 |
| 2006/0174319 | A1* | 8/2006 | Kraemer | G06F 21/53 |
| | | | | 726/1 |
| 2006/0265761 | A1 | 11/2006 | Rochette et al. | 726/27 |
| 2007/0234295 | A1 | 10/2007 | Dufor et al. | 717/124 |
| 2007/0240212 | A1 | 10/2007 | Matalytski | 726/22 |
| 2008/0016339 | A1* | 1/2008 | Shukla | G06F 21/53 |
| | | | | 713/164 |
| 2008/0134176 | A1* | 6/2008 | Fitzgerald et al. | 718/1 |

OTHER PUBLICATIONS

International Preliminary Report on Patentability and Written Oppinion, PCT Application No. PCT/US2009/056406; 8 pages, Mar. 24, 2011.

Singapore Written Opinion and Search Report for Application No. 201101234-1 dated Mar. 21, 2012, 24 pages.

Office Action for German Application No. 112009002168.9, 6 pages, Sep. 26, 2012.

Office Action for British Application No. GB1104065.6, 2 pages, Feb. 24, 2012.

* cited by examiner

DEPLOYMENT AND MANAGEMENT OF VIRTUAL CONTAINERS

CROSS-REFERENCE TO RELATED APPLICATIONS

This application is a continuation of pending U.S. patent application Ser. No. 12/556,525 filed Sep. 9, 2009; which claims the benefit of U.S. Provisional Application No. 61/095,538, filed Sep. 9, 2008, which are hereby incorporated in their entirety by reference.

FIELD OF THE INVENTION

This invention relates generally to information technology (IT) systems, and more specifically to systems and methods for deploying and managing applications in an enterprise environment.

BACKGROUND OF THE INVENTION

An enterprise environment includes multiple managed endpoints, such as user workstations, switches, and routers. This enterprise environment is managed by management computers that perform various information technology (IT) tasks on the managed endpoints. These tasks may include deploying or managing software applications on the endpoints or may include keeping the endpoints secure.

Often, it is desired to securely deploy an application to a managed endpoint with a particular configuration. It is also desirable to run the application on the managed endpoint in a secure and controlled manner, for example to comply with licensing restrictions or to prevent a user from unknowingly altering the configuration of the endpoint. It may also be preferable for the application to be deployed in a portable manner so that the correct functioning of the application is not dependent on the particular configuration of the endpoint.

What is needed are systems and methods for installing and maintaining software on managed endpoints in a secure, controlled, and portable manner.

SUMMARY

The above need is met by a system, method, and computer program product for virtualizing applications on a managed endpoint using containers. A managed endpoint receives a virtualized container from an IT automation appliance. The virtualized container includes an application and a virtualization module. The virtualization module includes computer program instructions for virtualizing the application. An operating system API call made by the application during execution is intercepted, and a portion of the computer program instructions are executed based on the operating system API call. The computer program instructions modify the behavior of the application to effect the file and data virtualization of the application. A virtualized container can be deployed and updated from an IT automation appliance along with an agent to support the deployment and updating of the virtualized container.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
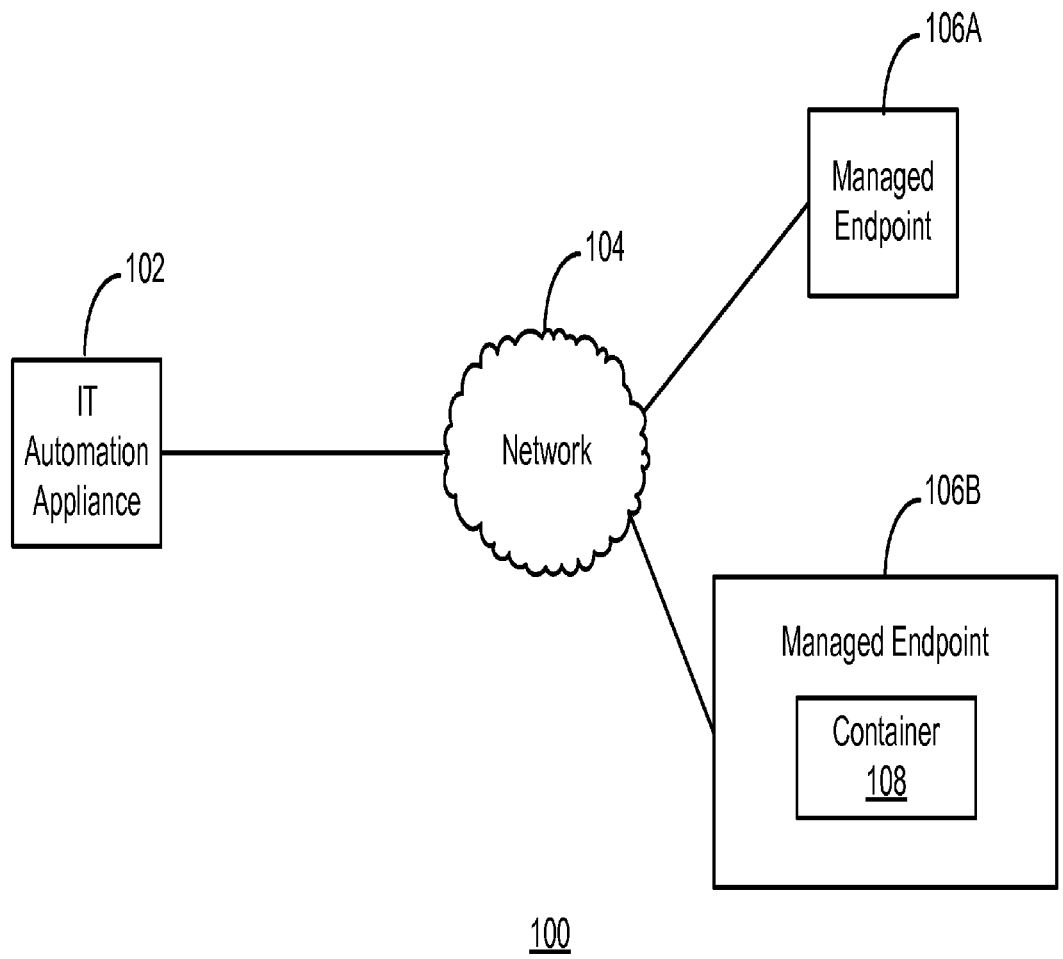
FIG. 1 is a high-level diagram illustrating an environment including an information technology (IT) automation appliance for deploying and managing containers on managed endpoints 106, in one embodiment.

FIG. 1 is a high-level diagram illustrating an environment 100 including an information technology (IT) automation appliance 102 (the "appliance") for deploying and managing containers 108 on managed endpoints 106, in one embodiment. The managed endpoints 106, also referred to as endpoints, are computing devices such as user workstations or routers. The appliance 102 may be configured to deploy and manage various types of containers 108 by an operator, such as a member of an IT staff. FIG. 1 shows an environment 100 with one appliance 102 and two managed endpoints 106. However, the environment 100 may contain thousands of managed endpoints 106 communicating with the appliance 102. Also, the environment 100 may contain multiple appliances 102, possibly with some appliances used for backup or load balancing purposes. The appliance 102 and managed endpoints 106 communicate through a network 104, such as the Internet or a corporate intranet.

The managed endpoints 106 include containers 108, also referred to as virtual containers, that are provided by the appliance 102. A container 108 may contain an application such as a word processor or system utility that runs on the managed endpoint 106. The container 108 provides virtualization by adding a layer between the application and the operating system of the managed endpoint 106. The container 108 can modify the behavior of the application so that the application and its data are isolated from the rest of the managed endpoint 106. This can increase the portability of the application and prevent the application from negatively affecting the rest of the managed endpoint 106 (e.g., via malware contained in the application). The container 108 can also restrict the usage of the application to comply with licensing restrictions or for security or other compliance reasons. In one embodiment, the behavior of the application is modified by intercepting calls made by the application to an API provided by the operating system. Containers 108 can be created and deployed to the managed endpoints 106 by the appliance 102. A single container can be deployed to many endpoints 106, and a single endpoint can have multiple containers (e.g. for multiple applications).

Figure 2:
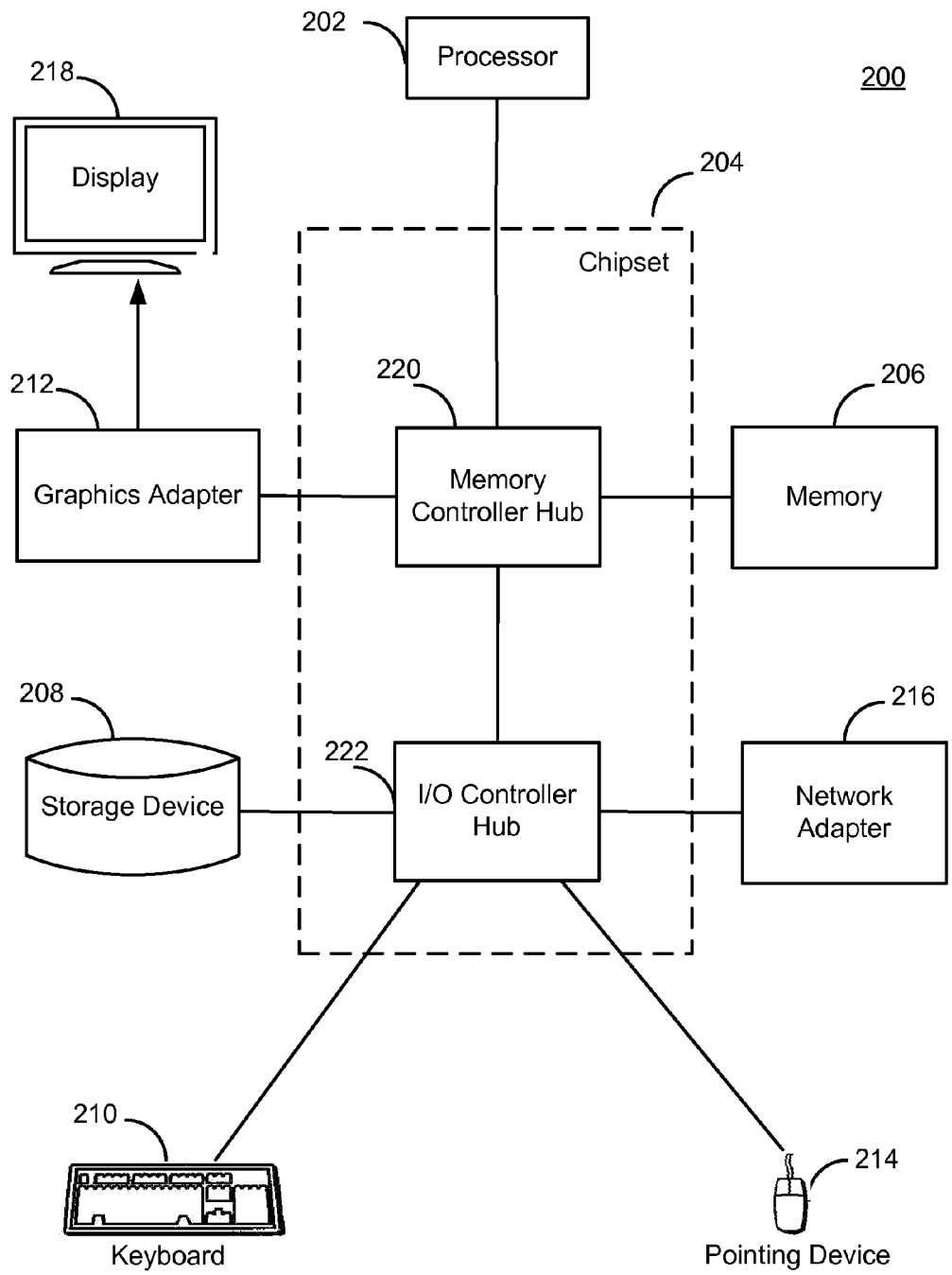
FIG. 2 is a high-level block diagram of a computer for acting as an appliance and/or a managed endpoint, in one embodiment.

FIG. 2 is a high-level block diagram of a computer 200 for acting as an appliance 102 and/or a managed endpoint 106, in one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as an appliance 102 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
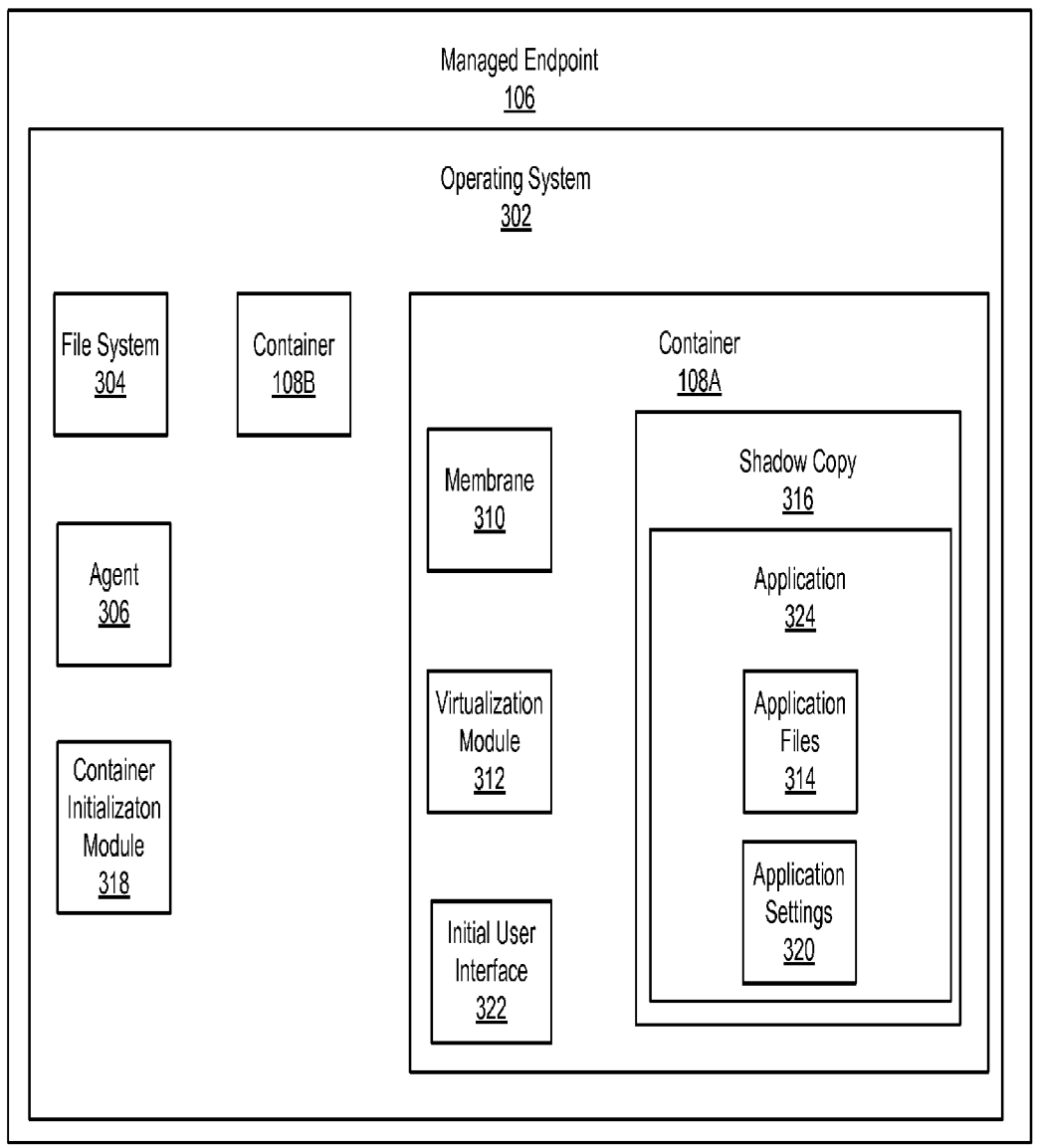
FIG. 3 is a block diagram illustrating a managed endpoint, in one embodiment.

FIG. 3 is a block diagram illustrating a managed endpoint 106, in one embodiment. As mentioned above, the managed endpoint 106 may be a user workstation. The managed endpoint 106 executes an operating system 302 such as Microsoft Windows Vista, Mac OS X, or Linux. The operating system 302 is capable of running various applications and provides various application program interfaces (API) calls to support the applications. Examples of API calls provided by the OS include calls for launching applications, accessing files, and creating windows on the display. The operating system 302 includes a file system 304 that may store various system files, applications, and user data. In one embodiment, the file system 304 is stored on a storage device 208 of the managed endpoint 106.

As mentioned above, containers 108 can be deployed to a managed endpoint 106 by the appliance 102. A container 108 is able to execute an application 324 on the managed endpoint while providing a contained environment for the application via virtualization. A managed endpoint 106 may have multiple containers 108A and 108B. A container 108 may execute multiple applications 324, though the discussion below uses a single application for clarity.

The application 324 of a container 108 comprises application files 314 and application settings 320. These application files 314 include various executable files, application data files, and libraries needed for the application 324 to execute. The application settings 320 include settings and options for the application 324, such as registry values. The application settings 320 may also be stored in files. Various background programs such as daemons or Windows services can also be specified through the application files 314 and/or the application settings 320.

A set of application files 314 and application settings 320 are initially included in a container 108, but application files and application settings can be modified over time by the executing application 324. In one embodiment, the application files 314 and application settings 320 include all the files and settings needed by the application 324 of the container 108. This is referred to as a "fully containerized" container. In a container 108 that is not fully containerized, some of the files and settings used by the application 324 can be located outside of the container (e.g., in a part of the file system 304 that is also used by the operating system 302). This may be useful for reducing the size of the container 108, but may result less independence, portability, and security of the container.

In one embodiment, the application files 314 and application settings 320 are stored in a shadow copy 316 within the container 108. This shadow copy 316 includes a directory structure that is expected by the application 324. In one embodiment, the shadow copy 316 is stored in a directory of the file system 304 reserved for the container 108. For example, in a Windows operating system, the files of a particular container 108 may all be located in the "c:\containers\contain1" directory. A particular library needed by that container 108 may be stored as "c:\containers\contain1\windows\system32\libxx.dll" if the contained application 324 expects the library to be located at "c:\windows\system32\libxx.dll". A file may actually exist at "c:Awindows\system32Vibxx.dll", however this file is not part of the container 108 and is not used by the application 324 in a fully containerized container.

Since only certain files are required by the application 324, some directories of the shadow copy 316 that normally contain many files (e.g., system file directories) may only contain a few files. In addition, some directories may be empty and available for use if any files need to be created by the application 324. Empty directories provide an expected directory structure for the application 324. In a container 108 that is not fully containerized, if a needed file is not found in the shadow copy 316, then it can be searched for in the rest of the file system 304.

A container 108 includes an initial user interface 322, such as a link, that can be used to start the application 324. A link to an appropriate executable file within the application files 314 prevents the user from having to navigate to a location in the shadow copy 316 to start the application 324 and maintains an appearance, from the user's perspective, that the application is running directly on the operating system 302. The initial user interface 322 may be a link, shortcut, URL, or other user interface element placed at a convenient location such as on the user's desktop.

The membrane 310 and virtualization module 312 implement the virtualization functionality of the container 108 with the cooperation of the container initialization module 318. The virtualization functionality may modify the application functionality (as provided by the application files 314 and application settings 320) to implement data isolation, container management, or modification of the application user interface, for example.

The container initialization module 318 initiates the virtualization functions of the container 108. In one embodiment, the container initialization module 318 is called when an application is executed. The container initialization module 318 determines whether the newly executed application is an application from within a container 108 or whether it is an application installed directly in the operating system 302 (i.e., not in a container). If it is determined to be an application not in a container 108, then the container initialization module 318 allows the application to execute normally without further intervention. If it determined to be an application 324 within a container 108, then the container initialization module 318 identifies the container 108 and executes or activates the virtualization module 312 (further described below) of that container. The container initialization module 318 can then allow execution of the application 324 to proceed.

The container initialization module 318 is installed in the operating system 302 of the managed endpoint 106 and can be used by multiple containers 108 on the managed endpoint. In one embodiment, the container initialization module 318 is notified by the operating system 302 every time a new application is started. The container initialization module 318 may hook into the operating system 302 in order to receive these notifications. In one embodiment, the container initialization module 318 monitors the activity of the operating system 302 to determine when a new application is started. The container initialization module 318 can determine whether an application is part of a container 108 based on the location of the application in the file system 304. In one embodiment, the container initialization module 318 can maintain a list of signatures of containerized applications 324 installed on the endpoint and use the list to determine if a newly executed application is containerized.

The virtualization module 312 provides the virtualization functions for a particular container 108. The virtualization module 312 can act as a type of hypervisor that manages the application 324. The virtualization module 312 inserts a layer between the executing application 324 and the operating system 302, allowing for control and containment of the application according to an administrative policy as described above (e.g., restricting usage for security or licensing reasons, changing application appearance, etc.). In one embodiment, the virtualization module 312 hooks code into various OS API calls to intercept the calls and perform desired operations. In one embodiment, the virtualization module 312 executes in the background and monitors the application to intercept OS API calls. The virtualization module 312 can be configured to only intercept OS API calls from the application 324 associated with the same container 108 to minimize any additional load on the processor 202 or other decrease in system performance.

In one embodiment, the virtualization module 312 intercepts OS API calls from the application 324 of the container 108. For example, if the application 324 makes an OS API call to write a file to the file system 304, this OS API call is intercepted by the virtualization module 312. The code in the virtualization module 312 may then cause the write to occur at a different location. This may be done to keep the files associated with the container 108 within the shadow copy 316 and isolated from the rest of the file system 304, and also to maintain an appearance to the user that the file is being written to the location that it would normally be written if the application were not in a container. For example, if the user saves a file to "c:\program_files\wordprocessor\userfiles\doc 1.txt" and the application therefore makes an OS API call to write a file to "c:\program_files\wordprocessor\userfiles\doc 1.txt", the virtualization module 312 can intercept the call and modify the filename parameter of the call so that the file is actually written to "c:\containers\contain1\program_files\wordprocessor\userfiles\doc1.txt". The virtualization module 312 may perform similar redirections for other file operations such as file reads. These redirections may be performed differently based on whether the container is fully contained or partially contained as mentioned above.

The virtualization module 312 may also intercept and modify other types of OS API calls. One type of OS API call that may be modified is a call to draw to the display 218 of the managed endpoint. For example, the title bar of the application window may be modified to mention that the application 324 is running in a container 108. The virtualization module 312 may also restrict the usage of the application 324 for security or licensing reasons. For example, in a web browsing application, if a user attempts to download a possibly dangerous executable file, the OS API function called by browser to retrieve the file from the remote location can be intercepted and the operation can be blocked or further checks can be performed on the file before determining whether to allow the OS API call to proceed. The container initialization module 318 can call an initialization function in the virtualization module 312 when the application 324 is executed. The initialization function may set up a user environment for a particular user when the application 324 is executed and may clean up the environment when the application is terminated. The initialization function may start any required services or daemons.

The membrane 310 can include information specifying the behavior of the container 108. The information in the membrane 310 may be read by the virtualization module 312 to determine what actions the virtualization module 312 should take when intercepting API calls or initializing the user environment. The membrane 310 may specify various user preferences for the application 324 and may specify various modifications to be made to the appearance of the application. With a web browser application, the membrane may include a list of whitelisted and/or blacklisted websites. When an API call is made by the web browser application to retrieve data from a website specified by the user, the virtualization module 312 can intercept the call and can check the list of websites in the membrane 310 to determine whether the website is blacklisted before allowing the API call to proceed.

The membrane 310 can include usage restrictions based on software licenses or company policy. The virtualization module 312 can query these restrictions to determine whether to allow a particular API call or whether to allow the application to execute at all. The membrane 310 can also store usage information collected by the virtualization module 312. For example, in the web browser application, each time the user visits a website, the virtualization module 312 can store the name of the website in the membrane 310.

The agent 306 communicates with the appliance 102 over the network 104 and carries out various management functions on the managed endpoint 106 as directed by the appliance 102. The agent 306 also provides information from the managed endpoint 106 to the appliance 102. The agent 306 can be installed on the managed endpoint 106 as part of an initial setup process of the endpoint. The agent 306 can install the container initialization module 318 on the managed endpoint 106 (e.g., after downloading the module from the appliance 102). The agent 306 can also install containers 108 on the managed endpoint 106 that are received from the appliance 102. The shadow copy 316 of the container 108 can be stored at a designated location for shadow copies of containers as mentioned above. The membrane 310 and virtualization module 312 of the container 108 can be stored in a particular location in the file system 304 that is not user-writeable.

The agent 306 can also update the container as directed by the appliance 102. For example, the appliance 102 may send a command to the agent 306 to add certain websites to a blacklist for a web browser application as described above. In response to the command, the agent 306 can modify the data in the membrane 310 to include the websites as blacklisted websites. In addition, the agent 306 can set switches in the membrane 310 to enable or disable the application 324 from executing based on commands from the appliance 102. This allows an administrator to easily enable or disable the execution of an application 324 on an endpoint 106 (including disabling an application immediately while it is being executed). The agent 306 can also remove a container 108 from the endpoint 106. If the files associated with the container 108 are limited to the shadow copy 316, then the removal can involve a simple deletion of the shadow copy (along removal of the membrane 310 and virtualization module 312) without affecting the operating system 302 or other applications.

Occasionally, updates of virtualization modules 312 may be produced and stored for distribution at the appliance 102. The agent 306 can occasionally check the appliance 102 for updated versions of the virtualization modules 312 in containers 108 at the endpoint 106. This check can be done by comparing version numbers or file signatures, for example. If the agent 306 determines that an updated virtualization module 312 is available, the agent can download the virtualization module and install it in place of the current virtualization module. The agent 306 can similarly update the membrane 310, application files 314, and application settings 316.

The use of containers 108 as described above for virtualizing applications can prevent the user from performing dangerous or prohibited activities and can monitor and limit the use of the applications 324. Containers 108 can also keep any effects of the application 324 (including the effects of malware) within the shadow copy 316 and protect the rest of the managed endpoint 106 and environment 100. Containers 108 also increase the portability of applications 324 by providing necessary files for the application within the shadow copy 316 at deployment. In one embodiment, a container 108 can be installed on a managed endpoint 106 from a portable storage device.

Figure 4:
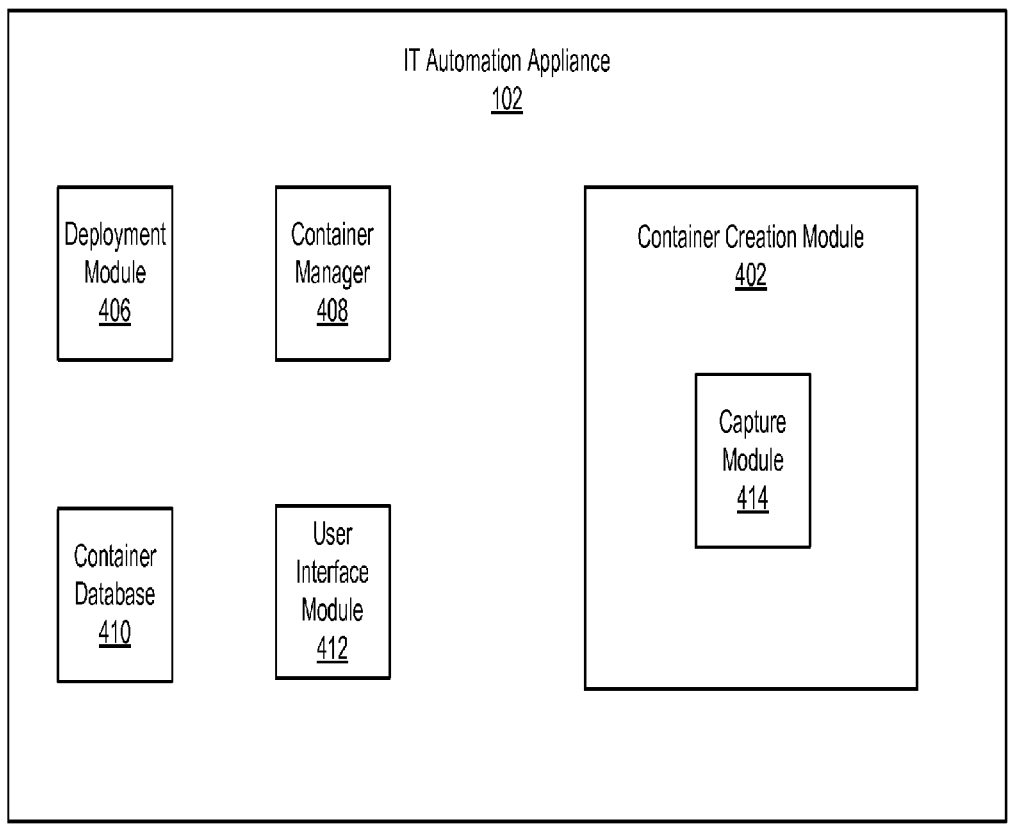
FIG. 4 is a block diagram illustrating an IT automation appliance, in one embodiment.

FIG. 4 is a block diagram illustrating an IT automation appliance 102, in one embodiment. As mentioned above, the appliance 104 can be used to create, deploy, and manage containers 108 on the managed endpoints 106.

The container creation module 402 is used to create containers 108 to be deployed on managed endpoints 106, in one embodiment. A system administrator can provide an installation program for a particular application 324 (e.g., a word processing application) to the container creation module 402. This installation program may include packages containing application files along with an installation script or executable program. One example is an "MSI" file used by the Windows Installer created by Microsoft Corporation. A system administrator can also provide additional information to the container creation module 402 to enable it to execute the installation program and create a container 108. This additional information may specify the operating system under which to run the installation (e.g., Microsoft Windows) and various options or parameters to be provided to the installation program. The additional information may also specify a staging machine (e.g., using an IP address) where the installation program can be run to create the container 108. In one embodiment, the staging machine may be the appliance 104 itself.

The container creation module 402 includes a capture module 414 that can capture various events during execution of the installation program on the staging machine. The capture module 414 captures the various files created during installation (e.g., application programs and libraries) and their locations within the file system. The capture module 414 also captures modifications made to settings in the environment, such as settings saved to a registry. In one embodiment, the capture module 414 captures some or all of the input and output operations of the installation program. The capture module 414 can observe the runtime logic of the installation program and can determine which files, libraries, and settings are required by the application. For example, the capture module 414 can observe the installation program checking for the presence of certain libraries, even if those libraries are not created by the installation program. The capture module 414 can also observe and capture any services or other entities created during installation. In one embodiment, the capture module 414 hooks into various system calls to perform its monitoring and capturing functions.

The container creation module 402 creates a shadow copy 316 based on information from the capture module 414. The shadow copy 316 includes the various files, settings, services, and other entities created by the installation program as determined by the capture module 414. The shadow copy 316 may also include other files or settings required by the application. If the container 108 is configured to be a "fully contained" container as described above, then all such files can be included. If it is not "fully contained", then files that are likely to already exist on the managed endpoint (e.g., in the operating system directories) can be omitted from the shadow copy 316.

The container creation module 402 also receives a virtualization module 312 and a membrane 310, in one embodiment. The virtualization module 312, which contains code to modify various API calls and perform other functions, can be created and compiled using standard or customized development tools. The membrane 310 can be created by saving various container settings specified by a system administrator in a particular format that is understood by the virtualization module 312. In one embodiment, the container creation module 302 packages the shadow copy 316, virtualization module 312, and membrane 310 together to form a container 108. The container creation module 402 can store the created container 108 in the container database 410 for later deployment.

The container database 410 includes containers 108 created by the container creation module 402. This may include a shadow copy 316 (including files and settings), virtualization module 312, and a membrane 310. It may also include various attributes for each container 108, such as the name of the application within the container and the possible platform and operating systems on which the container can run. A system administrator can access the container database 410 and search based on attributes when choosing a container 108 to deploy to an endpoint 106.

The deployment module 406 deploys containers 108 stored in the container database 410 to various managed endpoints. Deployments may be individually specified by a system administrator or may be automated based on a script or other criteria. A single container 108 may be deployed to thousands of managed endpoints 106. The deployment module 406 installs a container 108 on a managed endpoint 106 and configures it so that the application 324 within the container can be easily executed by a user at the managed endpoint 106. A deployment may also be initiated by a user at a managed endpoint 106. In this case, the user may contact the appliance 102 and request a deployment. The user may download a self-executing file that installs the container 108, including the shadow copy 316, membrane 310, and virtualization module 312, on the managed endpoint 106.

The deployment module 406 may cooperate with the agent 306 on the managed endpoint 106 to deploy the container 108. For example, the deployment module 406 can send a container over the network 104 to the agent 306. The agent 306 places the shadow copy 316 at a particular location designated for the container in the file system 304 as described above. The agent 306 also places the membrane 310 and virtualization module 312 at appropriate locations. The agent 306 also creates the initial user interface 322, for example by adding a shortcut to the user's desktop.

The container manager 408 manages containers 108 that have been deployed to managed endpoints 106. The container manager 408 may manage the containers through the agents 306 on the managed endpoints 106. The container manager 408 may send commands to enable or disable a container 108 to enforce usage restrictions on applications. This causes data in the membrane 310 to be modified as described above. The container manager 408 may retrieve usage data from the membrane 310. The container manager 408 may provide updated versions of membranes 310, virtualization modules 312, or shadow copies 316. These updates may alter the behavior of the application 324 or virtualization functions of the container 108 as described above. The container manager 408 can also re-flash the container on a managed endpoint to return the container to its initial state as deployed. This may be useful if the application begins malfunctioning and cannot be easily repaired. The re-flashing can be implemented by re-deploying the container to the managed endpoint.

The user interface module 412 can be used to control any of the container creation module 402, the deployment module 406, or container manager 408 by a system administrator. Through the user interface module 412, a system administrator can create, deploy, and manage containers to managed endpoints in the environment 100.

Figure 5:
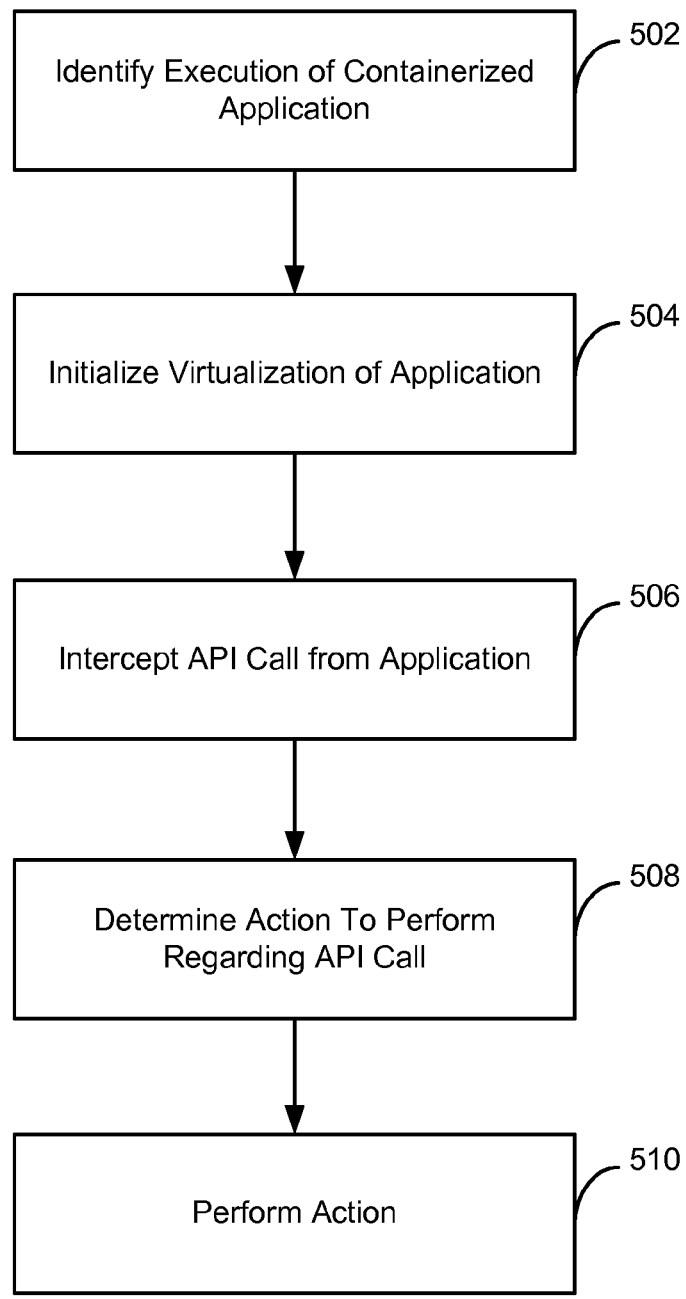
FIG. 5 is a flowchart illustrating a method for virtualizing an application using a container, in one embodiment.

FIG. 5 is a flowchart illustrating a method for virtualizing an application using a container 108, in one embodiment. A user at a managed endpoint 106 executes a containerized application 324 (i.e., an application having a container 108). The container initialization module 318 identifies 502 the execution of the containerized application 324, in one embodiment. The container initialization module 318 initializes 504 virtualization of the application 324 by executing the virtualization module 312 of the container 108. The virtualization module 312 may perform some setup functions such as starting required services or preparing the user environment. The virtualization module 312 intercepts 506 API calls from the executing application 324 by hooking the calls or monitoring the calls, for example. For an intercepted API call, the virtualization module 312 determines 508 an action to perform regarding the API call. For example, the virtualization module 312 may determine to allow the call to proceed unchanged, block the call, modify the parameters of the call, or make other API calls. The virtualization module 312 may use information in the membrane 310 to determine the action to perform. The virtualization module 312 then performs 510 the determined action.

Figure 6:
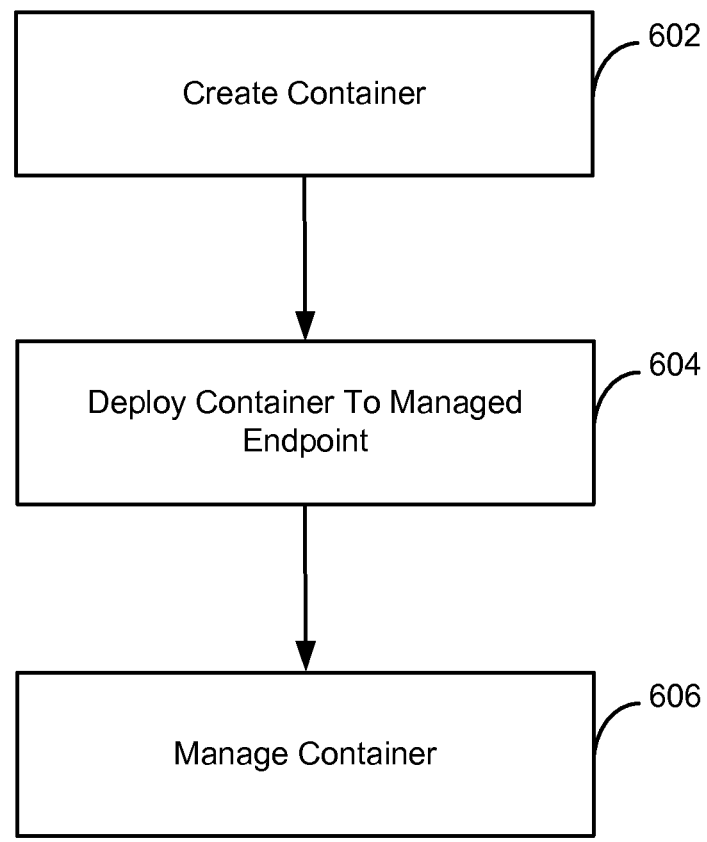
FIG. 6 is a flowchart illustrating a method for managing containers in an enterprise environment, in one embodiment.

FIG. 6 is a flowchart illustrating a method for managing containers 108 in an enterprise environment 100, in one embodiment. The container creation module 402 is used to create 602 a container of an application, where the container 108 includes a shadow copy 316 with application files and a virtualization module 312 for providing functionality to virtualize the application. The shadow copy 316 can be created by running an application installation program on a staging machine. The container 108 is deployed 604 to a managed endpoint 106 using the deployment module 406. The deployment may be initiated by a user at the managed endpoint 106. Containers 108 at the managed endpoints 106 are managed 606 by the container manager 408. Management may include enabling a container 108, disabling a container, retrieving usage information from the container, or updating the container (including the application 324, virtualization module 312, and membrane 310), for example.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A method for virtualizing applications on a computer using virtual containers, the method comprising:
   receiving, at a managed endpoint, a virtual container from a remote computer, the virtual container including an application and computer program instructions for virtualizing the application;
   storing the virtual container at the managed endpoint;
   determining that the application has started executing at the managed endpoint;
   creating a user environment for a user of the application;
   monitoring, by the computer program instructions for virtualizing the application, the application for an operating system application program interface (API) call to write a file to a file system of the managed endpoint, the file system located outside of the virtual container;
   determining whether to allow the operating system API call to write the file to the file system to proceed, and in response to the determination:
      blocking, by the computer program instructions for virtualizing the application, the operating system API call to write the file to the file system;
      modifying a filename parameter of the operating system API call to redirect the file to the virtual container;
      modifying the user environment to reflect redirection of the file to the virtual container;
      writing the file to a location within the virtual container; and
      executing the computer program instructions for virtualizing the application that are configured to modify a behavior of the application including:
         isolating the application from other applications executing at the managed endpoint; and
         isolating data associated with the application from other data stored at the managed endpoint.

2. The method of claim 1, wherein the computer program instructions for virtualizing the application are further configured to prevent the application from accessing malware.

3. The method of claim 1, further comprising re-flashing the virtual container to return the virtual container to its initial state.

4. The method of claim 1, further comprising:
   determining whether the application executing at the managed endpoint is part of the virtual container; and
   hooking the computer program instructions for virtualizing the application into an appropriate operating system API call in response to determining that the application is part of the virtual container.

5. A system for virtualizing applications on a computer using virtual containers, the system comprising:
   a processor;
   a non-transitory, computer-readable medium communicatively coupled to the processor; and
   computer program instructions stored on the computer-readable medium, the computer program instructions configured to, when executed by the processor, cause the processor to:
      receive a virtual container at a managed endpoint from a remote computer and store the virtual container at the managed endpoint, the virtual container including an application and computer program instructions configured for virtualizing the application;
      determine that the application has started executing at the managed endpoint;
      create a user environment for a user of the application;
      monitor the application for an operating system application program interface (API) call to write a file to a file system of the managed endpoint, the file system located outside of the virtual container;
      determine whether to allow the operating system API call to write the file to the file system to proceed, and in response to the determination:
         block the operating system API call to write the file to the file system;
         modify a filename parameter of the operating system API call to redirect the file to the virtual container;
         modify the user environment to reflect redirection of the file to the virtual container;
         write the file to a location within the virtual container; and
         execute the computer program instructions for virtualizing the application that are configured to modify a behavior of the application including:
            isolating the application from other applications executing at the managed endpoint; and
            isolating data associated with the application from other data stored at the managed endpoint.

6. The system of claim 5, wherein the computer program instructions for virtualizing the application are further configured to, when executed by the processor, prevent the application from accessing malware.

7. The system of claim 5, wherein the computer program instructions are further configured to, when executed by the processor, cause the processor to re-flash the virtual container to return the virtual container to its initial state.

8. The system of claim 5, wherein the computer program instructions are further configured to, when executed by the processor, cause the processor to:
   determine whether the application is part of the virtual container; and
   hook the computer program instructions for virtualizing the application into appropriate operating system API calls in response to determining that the application is part of the virtual container.

9. A non-transitory, computer-readable medium storing computer program instructions that, when executed by a processor, cause the processor to:
   receive, at a managed endpoint, a virtual container from a remote computer, the virtual container including an application and computer program instructions for virtualizing the application;
   store the virtual container at the managed endpoint;
   determine that the application has started executing at the managed endpoint;
   create a user environment for a user of the application;
   monitor the application for an operating system application program interface (API) call to write a file to a file system of the managed endpoint, the file system located outside of the virtual container;
   determine whether to allow the operating system API call to write the file to the file system to proceed, and in response to the determination:
      block the operating system API call to write the file to the file system;
      modify a filename parameter of the operating system API call to redirect the file to the virtual container;
      modify the user environment to reflect redirection of the file to the virtual container;
      write the file to a location within the virtual container; and
      execute the computer program instructions for virtualizing the application that are configured to modify a behavior of the application including:
         isolating the application from other applications executing at the managed endpoint; and
         isolating data associated with the application from other data stored at the managed endpoint.

10. The computer-readable medium of claim 9, wherein the computer program instructions for virtualizing the application are further configured to, when executed by the processor, cause the processor to prevent the application from accessing malware.

11. The computer-readable medium of claim 9, wherein the computer program instructions are further configured to, when executed by the processor, cause the processor to re-flash the virtual container to return the virtual container to its initial state.

12. The computer-readable medium of claim 9, wherein the computer program instructions are further configured to, when executed by the processor, cause the processor to:
   determine that the application is part of a virtual container; and
   hook the computer program instructions for virtualizing the application into an appropriate operating system API call in response to determining that the application is part of the virtual container.

* * * * *